July 7, 1953 K. W. SMALL 2,644,858
STEERING WHEEL MICROPHONE
Filed May 11, 1951
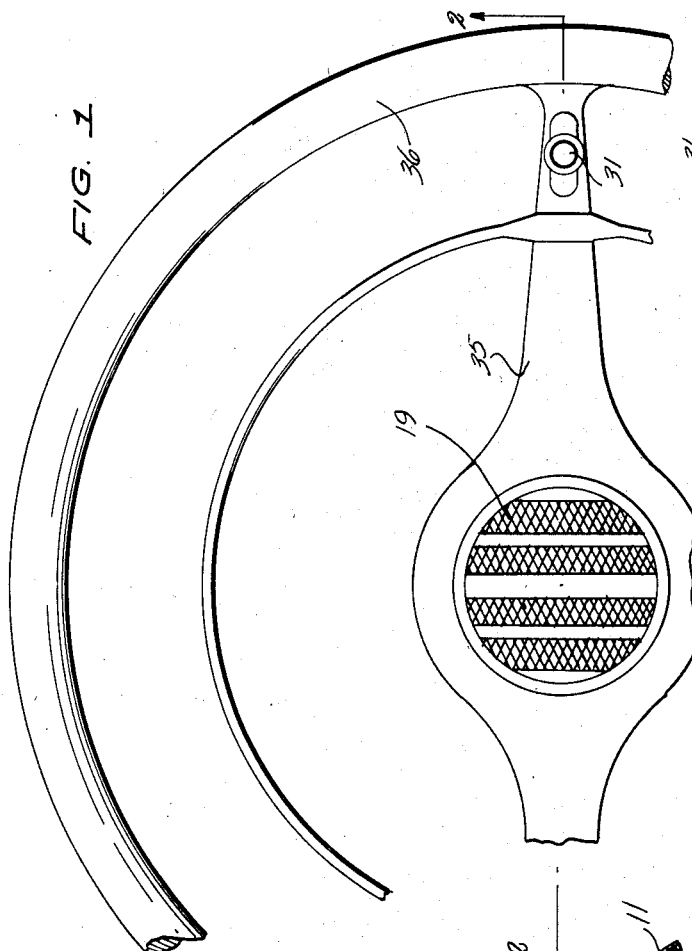
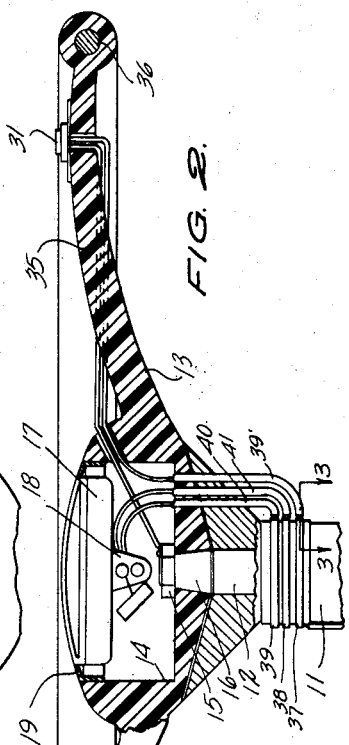
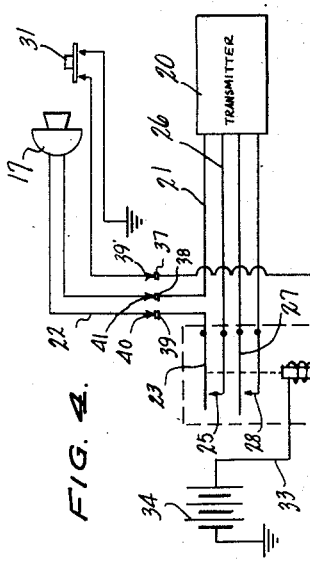
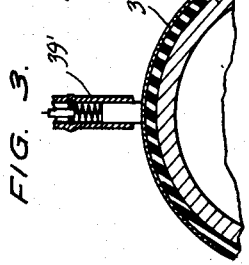
INVENTOR
KENNETH W. SMALL,
BY
*McMorrow, Berman & Davidson*
ATTORNEYS Patented July 7, 1953

2,644,858

UNITED STATES PATENT OFFICE 2,644,858

STEERING WHEEL MICROPHONE

Kenneth W. Small, Independence, Mo.

Application May 11, 1951, Serial No. 225,821

2 Claims. (Cl. 179—146)

This invention relates to improvements in steering wheels, and more particularly in a steering wheel assembly for a motor vehicle which includes a microphone.

A main object of the invention is to provide a novel and improved motor vehicle steering wheel wherein a microphone is installed to be used in conjunction with a radio transmitter mounted on the motor vehicle, the assembly being simple in construction, involving only a few parts, and being easy to control by the person steering the vehicle.

A further object of the invention is to provide an improved steering wheel assembly for a motor vehicle which includes a microphone installed therein, the assembly involving inexpensive parts, being durable in construction, and providing a considerable saving in space, as well as insuring that the microphone is in a convenient position for use by the operator of the vehicle at all times.

Further objects and advantages of the invention will become apparent from the following description and claims, and from the accompanying drawings, wherein:

Figure 1 is a fragmentary top plan view of an improved steering wheel provided with a microphone installed in accordance with the present invention;

Figure 2 is a vertical cross-sectional view taken on the line 2—2 of Figure 1;

Figure 3 is an enlarged cross-sectional detail view taken on the line 3—3 of Figure 2;

Figure 4 is a schematic wiring diagram showing the connections of the microphone of Figures 1 and 2 in relation to the radio transmitter mounted on the vehicle.

Referring to the drawings, 11 designates a conventional motor vehicle steering column, and 12 designates the steering shaft rotatably mounted in the column 11. Designated at 13 is a steering wheel which is formed at its hub portion with a recess 14. As shown in Figure 2, the steering post 12 extends into the recess 14 and is secured to the steering wheel 13 by a nut 15. The top portion of the shaft 12 is tapered, as shown at 16, and the upper portion of the bore in the steering wheel 13 through which the tapered portion 16 extends is likewise tapered, whereby tightening of nut 15 rigidly secures the steering wheel 13 to the shaft 12.

Designated at 17 is a microphone which is secured in the recess 14, said microphone being provided with a supporting bracket 18 which is secured to the inside wall of recess 14, rigidly securing the microphone 17 centrally in the hub of the steering wheel with said microphone facing upwardly, as shown in Figure 2. A suitable protective covering screen 19 is secured in the upper rim portion of recess 14 in protective overlying relationship to microphone 17.

Referring now to the wiring diagram of Figure 4, it will be seen that the microphone 17 has one terminal thereof connected to the vehicle radio transmitter 20 by a conductor 21. The other terminal of microphone 17 is connected by a conductor 22 to the armature 23 of a relay 24. Associated with the armature 23 is a stationary contact 25 which is connected by a conductor 26 to the radio transmitter, the connection of the microphone to the transmitter being completed when the armature 23 engages the contact 25. Normally, when the relay 24 is deenergized, the armature 23 is out of engagement with contact 25, whereby the microphone 17 is disconnected from the transmitter 20. The energization of the transmitter is controlled by another armature 27 controlled by relay 24 which is arranged to cooperate with a stationary contact 28. Normally, when the relay 24 is deenergized, armature 27 is out of contact with respect to element 28 and the transmitter 20 is deenergized. However, when the relay 24 is energized, armature 27 engages contact 28, completing the energizing circuit for the transmitter and also connecting the microphone 17 to said transmitter by the engagement of armature 23 with contact 25. The remainder of the energizing circuit for the transmitter is not shown, but the above-described arrangement is conventional and it is believed to be well known in the art, requiring no further description or explanation thereof. The relay 24 is controlled by a manually operated switch 31 or by a foot operated switch 32. As shown in Figure 4, the switches 31 and 32 are connected in parallel between one terminal of relay 24 and the ground, the other terminal of said relay 24 being connected by a wire 33 to one pole of a battery 34, the other pole of the battery being grounded. Closure of either switch 31 or switch 32 energizes the relay 24, thereby energizing transmitter 20 and closing the circuit of microphone 17, as above described.

The switch 31 is mounted in one of the spokes 35 of the steering wheel adjacent the rim 36 thereof. Secured on the stationary steering wheel column 11 and insulated therefrom are respective contact rings 37, 38 and 39. The connection of switch 31 to the relay 24 is made through an insulated rigid brush member 39 which is in sliding contact with the ring 37 and remains in conductive engagement therewith when the steering wheel is rotated. The respective connections of the microphone 17 to the relay 24 and the transmitter 20 are made through respective rigid insulated brush members 40 and 41 which are secured in the hub of the steering wheel together with the brush member 39', and which make sliding contact with the respective contact rings 39 and 38, as shown in Figure 2, and maintain conductive engagement with said conductor rings when the steering wheel is rotated.

It will be readily apparent that in order to connect the microphone 17 to the transmitter 20 and to energize the transmitter, it is merely necessary for the operator to close the switch 31 or to close the switch 32, whereupon the operator may transmit a radio signal from the vehicle with no further manipulations of the apparatus. The operator may transmit radio signals while driving the vehicle and without releasing the steering wheel, inasmuch as the switch 31 may be reached by one of the fingers of the hand gripping the rim 36 of the steering wheel.

While a specific embodiment of an improved microphone arrangement in a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle having a stationary steering column and a steering wheel rotatably mounted on said column, said steering wheel including a hollow hub and a plurality of spokes secured to said hub, a microphone mounted in said hub, a control switch mounted on one of said spokes, a plurality of contact rings secured on said column, respective contact brushes carried by said steering wheel and engaging said contact rings, a control relay, an energizing circuit for said control relay including said control switch and certain of the contact rings and contact brushes, and circuit means for connecting the microphone to a transmitter on the vehicle and including the contact of said control relay.

2. In a vehicle having a stationary steering column and a steering wheel rotatably mounted on said column, said steering wheel including a hollow hub and a plurality of spokes secured to said hub, a microphone mounted in said hub, a control switch mounted on one of said spokes, a plurality of contact rings secured on said column, respective contact brushes carried by said steering wheel and engaging said contact rings, a control relay, an energizing circuit for said control relay including said control switch and certain of the contact rings and contact brushes, and circuit means for connecting the microphone to a transmitter on the vehicle, said circuit means including the contact of said control relay and the remainder of said contact rings and contact brushes.

KENNETH W. SMALL.

UNITED STATES PATENTS

| Number | Name | Date |
|---|---|---|
| 2,491,968 | Gilbert | Dec. 20, 1949 |